Sept. 12, 1961  J. R. THORSON  2,999,693
TRAILER-MOUNTED MISSILE RACK

Filed April 24, 1959  2 Sheets-Sheet 1

INVENTOR
JOHN R. THORSON

BY *H. Fredrick Hamann*

ATTORNEY

Sept. 12, 1961 J. R. THORSON 2,999,693
TRAILER-MOUNTED MISSILE RACK
Filed April 24, 1959 2 Sheets-Sheet 2

INVENTOR
JOHN R. THORSON
BY *H. Frederick Hamann*
ATTORNEY

United States Patent Office 2,999,693
Patented Sept. 12, 1961

2,999,693
TRAILER-MOUNTED MISSILE RACK
John R. Thorson, Takoma Park, Md., assignor to ACF Industries, Incorporated, New York, N.Y., a corporation of New Jersey
Filed Apr. 24, 1959, Ser. No. 808,684
10 Claims. (Cl. 280—29)

This invention relates to vehicles and, more particularly, to trailers adapted to detachably connected to and moved by a tractor.

The present invention contemplates the provision of a trailer adapted for use in transporting articles, such as bombs, missiles, etc., to and from storage areas, and has for an object the provision of a trailer which is relatively simple and inexpensive in construction and reliable in operation.

Another object of the invention resides in the provision of an adapter frame adapted to be detachably connected to a trailer chassis to support a missile rack.

A further object of the invention resides in the provision of a missile rack adapted to be detachably mounted upon an adapter frame.

Another object of the invention resides in the provision of means for resiliently supporting a missile rack upon an adapter frame mounted upon a trailer chassis.

The invention embodies other novel features, details of construction and arrangement of parts which are hereinafter set forth in the specification and claims and illustrated in the accompanying drawings, forming part thereof, wherein:

Figure 1:
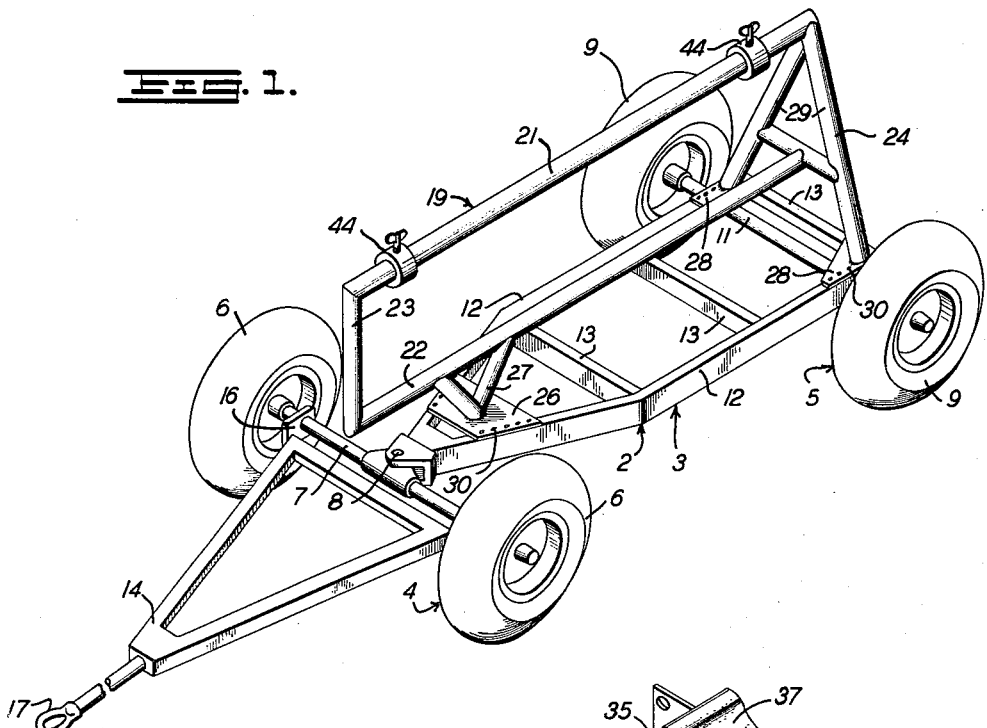
FIG. 1 is a perspective view illustrating a trailer embodying features of the invention.
Figure 2:
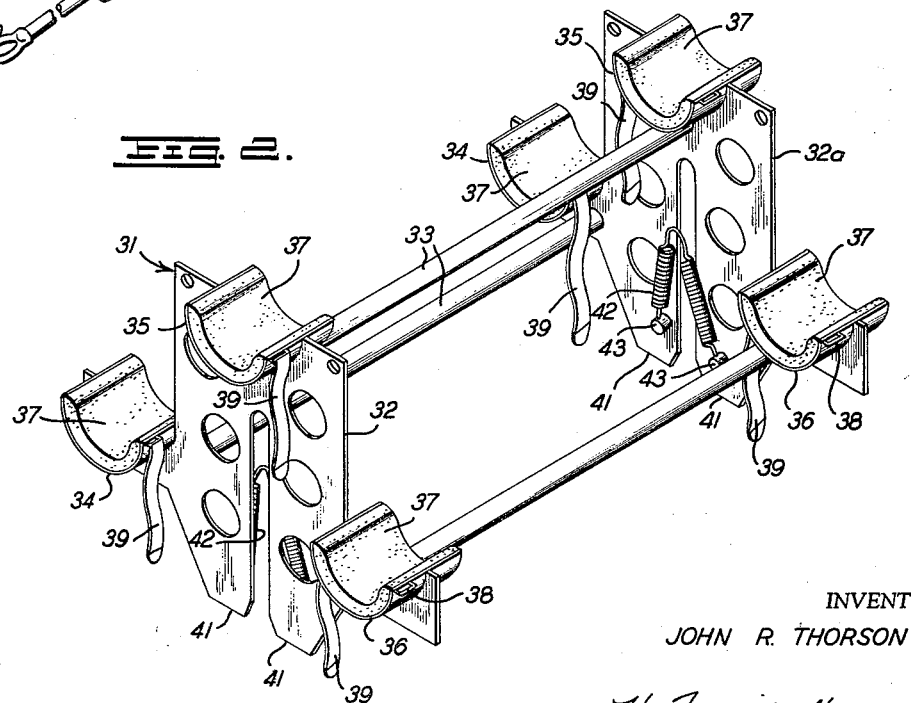
FIG. 2 is a perspective view illustrating a missile rack adapted to be mounted upon an adapter frame provided on the trailer.
Figure 3:
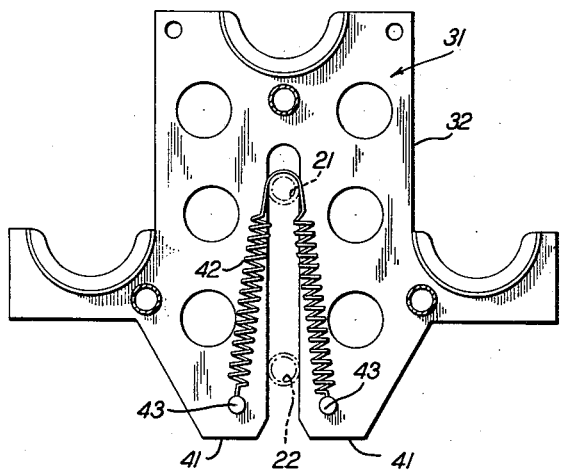
FIG. 3 is an end elevation illustrating the manner of resiliently supporting the missile rack upon the adapter frame.

Referring now to the drawings for a better understanding of the invention and more particularly to FIGS. 1 to 3 therein, the trailer is shown as comprising a chassis 2 embodying a frame 3 supported upon wheel and axle assemblies 4 and 5. The front wheel and axle assembly is shown as comprising a pair of wheels 6—6 journaled on a front axle 7 which is pivotally connected to the front end of the frame 3 by a pivot pin 8. The rear assembly 5 comprises a pair of wheels 9—9 journaled on a rear axle 11 secured to the back end of the frame 3.

To provide a relatively strong, light weight structure, the frame 3 is preferably constructed of steel side rails 12—12 interconnected by steel cross members 13. A drawbar 14 is provided with bearings 16—16 journaled on opposite ends of the front axle 7 and is adapted to be detachably connected to a conventional tractor by means of a coupling pin engageable in an eye connection 17 provided on the front end of the drawbar.

Figure 4:
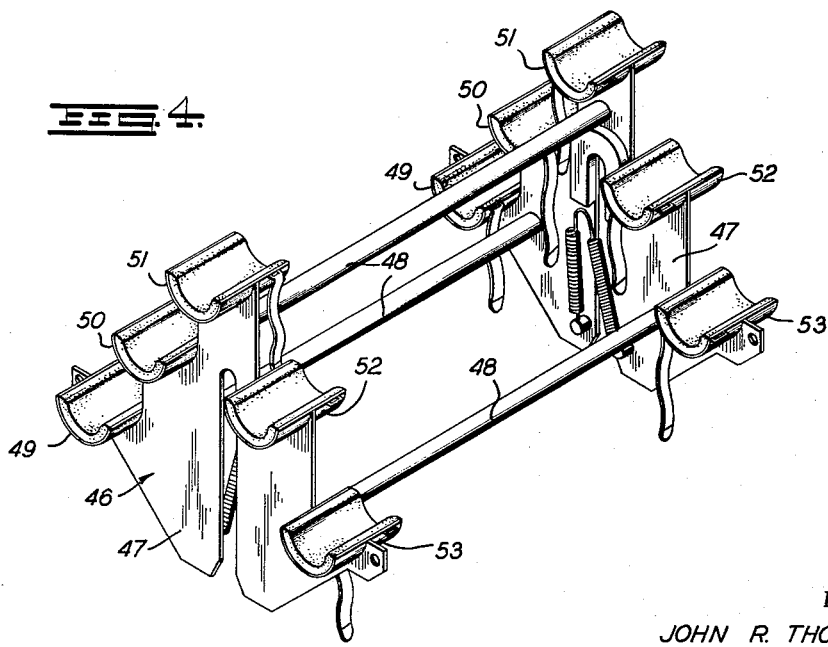
FIG. 4 is a perspective view illustrating a modified form of missile rack.

The trailer is adapted for use in transporting Sidewinder and Sparrow missiles into and out of storage when an adaptor frame 19 is mounted thereon to support a missile rack of the types shown in FIGS. 3 and 4.

The adaptor frame 19 is shown as comprising upper and lower tubular beams 21 and 22 interconnected at their ends by a front member 23 and a rear A frame 24. A front plate 26 is secured to the lower beam 22 by legs 27; and rear plates 28—28 are secured to the lower ends of the legs 29—29 of the A frame 24. The adaptor frame 19 is detachably connected to the trailer by means of bolts or screws 30 securing the plates 26 and 28 to the side rails 12—12 of the frame 3.

FIGS. 2 and 3 illustrate a missile rack 31 adapted to be resiliently mounted upon the adaptor frame 19 to receive and support a plurality of Sparrow type missiles. The missile rack is shown as comprising identical end plates 32—32a interconnected by a plurality of tubular members 33. Each end plate is formed with arcuate recesses to receive arcuate cradle plates 34, 35 and 36 which are faced with a soft material 37, such as sponge rubber, and formed with slots 38 to receive a belt 39 having a buckle on one end thereof, cradle plates 35 being mounted on the upper medial portions of end plates 32—32a and cradle plates 34 and 36 being mounted on lateral extensions of the end plates.

The lower ends of the end plates 32 and 32a are bifurcated to provide legs 41—41 to straddle the tubular beams 21 and 22 of the adaptor frame 19, as illustrated in FIG. 3. To resiliently support the missile rack 31 upon the adaptor frame 19, the ends of tension springs 42 are secured to studs 43 mounted on the legs 41—41 of each end plate and the medial portion of each spring is engaged over the upper beam 21. Stop collars 44 are provided on the upper beam 21 to prevent movement of the missile rack longitudinally of the adaptor frame 19. The rack 31 thus shown and described is adapted to support three missiles.

FIG. 4 illustrates a modified form of missile rack 46 comprising end plates 47—47 interconnected by a plurality of tubular members 48. Each end plate has cradles 49, 50, 51, 52 and 53 mounted thereon to support Sidewinder type missiles. This form of the invention is otherwise similar to the embodiment shown in FIGS. 2 and 3 in the drawings.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a trailer for transporting bombs and missiles, a chassis including a frame supported on front and rear wheel and axle assemblies, means pivotally connecting the front wheel and axle assembly to said frame, a drawbar connected to said front wheel and axle assembly, an adaptor frame mounted on said chassis frame and comprising vertically spaced upper and lower beams, a missile rack comprising end plates interconnected by beam members, said plates having leg portions straddling said upper and lower beams, and arcuate cradles on said end plates to support missiles.

2. In a trailer for transporting bombs and missiles, a chassis including a frame supported on front and rear wheel and axle assemblies, means pivotally connecting the front wheel and axle assembly to said frame, a drawbar connected to said front wheel and axle assembly, an adaptor frame mounted on said chassis frame and comprising vertically spaced upper and lower beams, a missile rack comprising end plates interconnected by beam members, said plates having leg portions straddling said upper and lower beams, arcuate cradles on said end plates to support missiles, and means resiliently supporting said rack on said upper beam.

3. In a trailer for transporting bombs and missiles, a chassis including a frame supported on front and rear wheel and axle assemblies, means pivotally connecting the front wheel and axle assembly to said frame, a drawbar connected to said front wheel and axle assembly, an adaptor frame mounted on said chassis frame and comprising vertically spaced upper and lower beams, a missile rack comprising end plates interconnected by beam members, said plates having leg portions straddling said upper and lower beams, arcuate cradles on said end plates to support missiles, and means comprising a tension spring on each end plate for resiliently supporting said rack on said upper beam.

4. A trailer comprising a chassis frame, wheel and axle assemblies supporting said frame, an adaptor including a pair of vertically spaced frame members medially mounted on said chassis frame, a rack detachably mounted on said adaptor frame, said rack including spaced end plates, each of said end plates including legs straddling said adaptor frame, and tension springs secured to said legs and engaging said adaptor frame to resiliently support said rack.

5. A trailer comprising a chassis frame, wheel and axle assemblies supporting said frame, an adaptor frame mounted on said chassis frame, said adaptor frame including vertically spaced tubular beam members, a rack detachably mounted on said adaptor frame, said rack including end plates formed with vertical slots for straddling said tubular beams, brace members connecting said plates, and legs supporting opposite ends of said beams upon said chassis frame.

6. A trailer comprising a chassis frame, wheel and axle assemblies supporting said frame, an adaptor frame mounted on said chassis frame, a rack detachably mounted on said adaptor frame, said rack having legs straddling said adaptor frame, said adaptor frame comprising vertically spaced beams, and legs supporting opposite ends of said beams upon said chassis frame, said rack having pairs of cradles thereon to support opposite ends of missiles.

7. In a trailer for transporting bombs and missiles, a chassis including a frame supported on front and rear wheel and axle assemblies, means pivotally connecting the front wheel and axle assembly to the frame, an adaptor frame mounted on said chassis and comprising a lower frame member having legs secured to said chassis, said adaptor frame including an upper tubular beam spaced from and vertically positioned above said lower frame member, said adaptor frame extending longitudinally of the chassis, a rack member, said rack member including transversely extending end plates, said plates being vertically recessed for straddling said upper tubular beam of said adaptor frame, and longitudinally extending braces connecting said end plates.

8. The structure of claim 7 characterized in that a plurality of pairs of longitudinally aligned cradles are supported by said end plates.

9. The structure of claim 7 characterized in that the end plates include lateral extensions for supporting aligned upwardly facing cradles.

10. The structure of claim 7 characterized in that aligned upwardly facing cradles are supported on the medial upper portion of said end plates.

References Cited in the file of this patent

UNITED STATES PATENTS

| | | |
|---|---|---|
| 1,144,957 | Andree | June 29, 1915 |
| 1,151,210 | Martin | Aug. 24, 1915 |
| 1,312,516 | Breitenbach | Aug. 12, 1919 |
| 1,930,076 | Bentley | Oct. 10, 1933 |
| 2,298,851 | Wachter | Oct. 13, 1942 |
| 2,343,844 | Milburn et al. | Mar. 7, 1944 |
| 2,497,352 | Gilbreath | Feb. 14, 1950 |
| 2,643,777 | Pickens | June 30, 1953 |
| 2,747,780 | Puddy | May 29, 1956 |

FOREIGN PATENTS

| | | |
|---|---|---|
| 710,420 | Germany | Sept. 12, 1941 |